Patented Apr. 30, 1929.

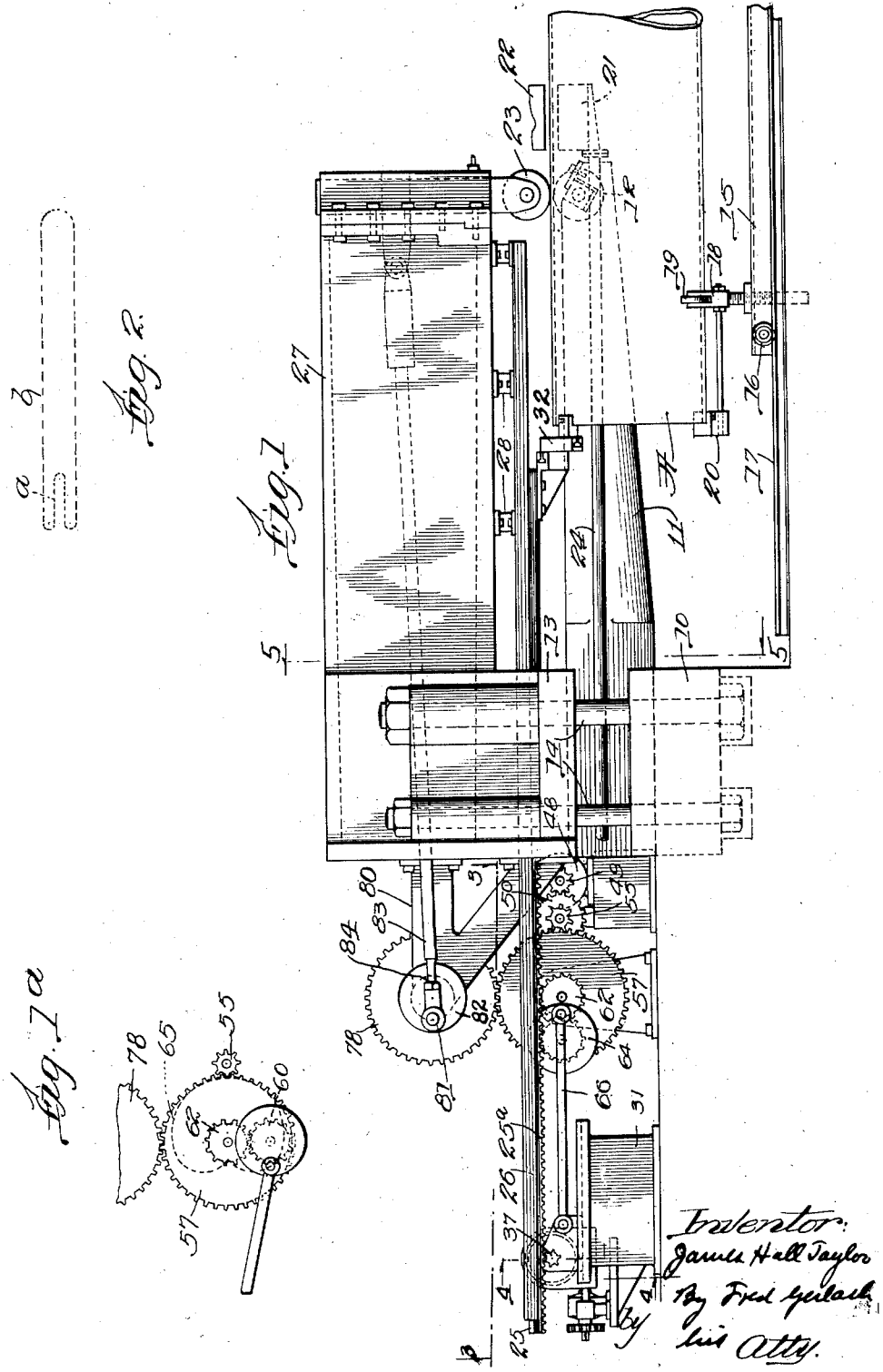

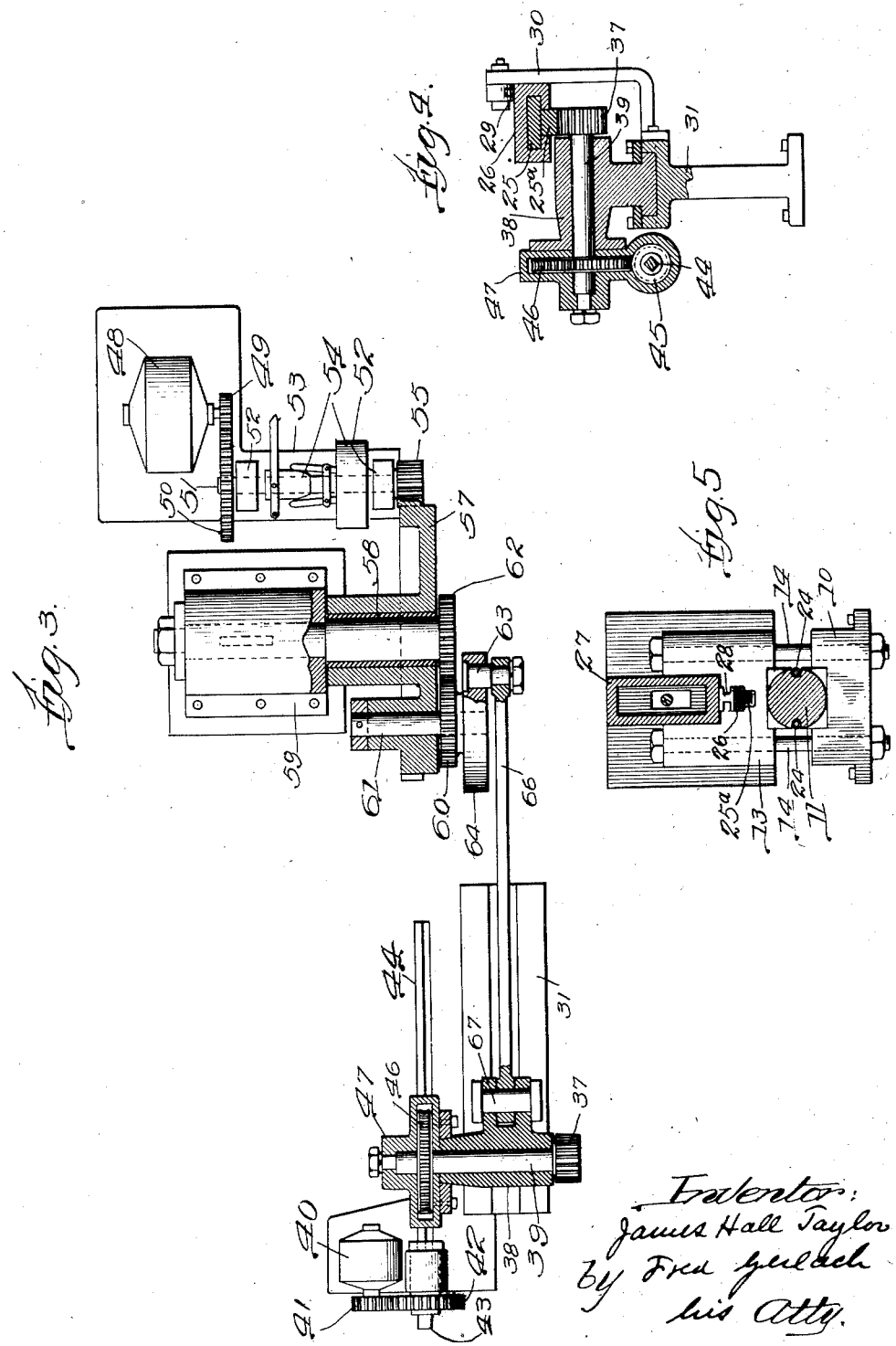

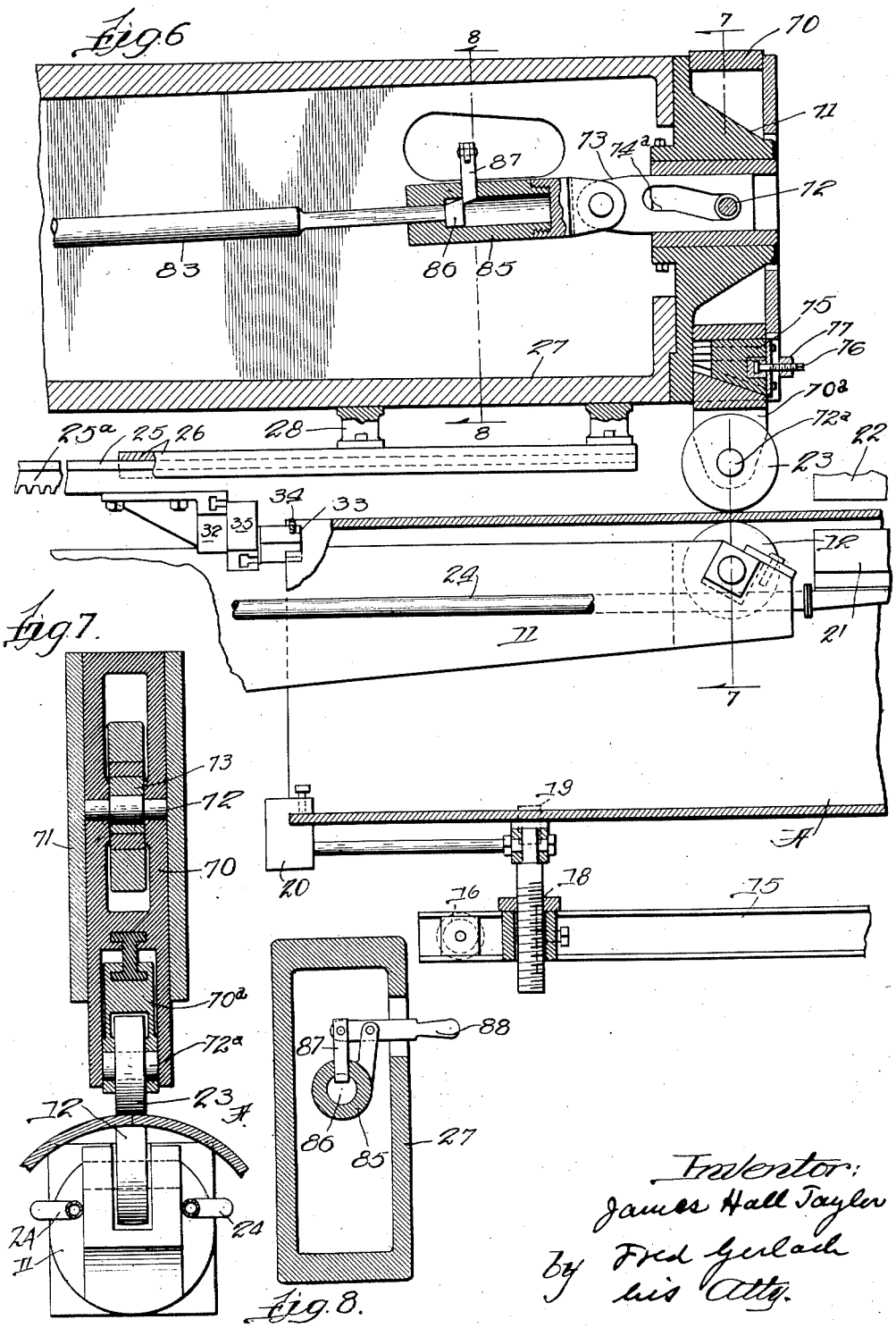

1,711,130

UNITED STATES PATENT OFFICE.

JAMES HALL TAYLOR, OF OAK PARK, ILLINOIS.

PIPE-WELDING MACHINE.

Application filed September 27, 1923. Serial No. 665,101.

The invention relates to pipe welding machines, and its object to improve the welding done in the type of machine in which successive portions of the pipe are welded between movements thereof to a heater, so that successive portions thereof will be alternately heated and then subjected to welding pressure immediately after being heated.

This result is attained by providing automatic mechanism for differentially moving the pipe relatively to the welding-rolls or members, so that the passes of the pipe between them will be greater in number than the times each pipe-portion adjacent the welding zone is moved back from said zone to the heater. By providing pipe-shifting mechanism which is operated so it will automatically or without manual manipulation of the control for the shifting mechanism, impart these compound or differential strokes to the pipe, the welding will be more efficiently done and the capacity of the machine will be increased by reason of the elimination of unnecessary or non-productive portions of the strokes.

The invention consists in the several novel features hereinafter set forth and more particularly defined by claims at the conclusion hereof.

In the drawings: Fig. 1 is a side elevation of a machine embodying the invention. Fig. 1ª is an elevation showing the pipe shifting gearing in a different position. Fig. 2 is a diaphragm of the path of movement of the pipe and its shifting mechanism. Fig. 3 is a horizontal section on line 3—3 of Fig. 1. Fig. 4 is a vertical transverse section on line 4—4 of Fig. 1. Fig. 5 is a transverse section on line 5—5 of Fig. 1. Fig. 6 is a longitudinal section showing the welding rolls and associated parts. Fig. 7 is a section on line 7—7 of Fig. 6. Fig. 8 is a section on line 8—8 of Fig. 6.

The invention is exemplified in a machine comprising a suitable bed or base 10 which is fixed in the floor, an arm 11 which is adapted to extend into the pipe to be welded, carries the lower welding-roll or member 12 at its outer end for engaging the inner periphery of the pipe, and has its inner end rigidly secured to base 10, being clamped thereon by an upper frame-member 13 and bolts 14, a truck 15 which is provided with rollers 16 to run on rails 17 and with a vertically adjustable bracket 18 which has rollers 19 for supporting the pipe while it is being welded, and a hook 20 engaging the front end of the pipe so the truck will travel with the pipe; suitable inner and outer heaters 21, 22, for bringing the metal adjacent the joint to welding heat, and an upper roll 23 which coacts with roll 12 to weld the pipe and is vertically movable into and out of contact with the pipe to alternately exert welding pressure on it and to release it for movement to and from the heaters. Gas pipes 24 arranged in grooves in the sides of arm 11, supply gas to burner 21 for the inside of the pipe. Roller 12 is adjustably mounted in arm 11 as well understood in the art.

The pipe A to be welded is secured to move with and to be shifted by a reciprocable rack 25ª which is fixed to a back-bar 25 which is slidable in a channeled guide 26. The latter is suspended from and fixed to a lateral extension or member 27 of frame 13, by brackets 28, and is also supported at 29 by a bracket 30 on a stationary base 31. The connection between the pipe and rack 25ª comprises a bracket 32 fixed to the rack; a lug 33 grooved to receive and provided with a screw 34 to clamp the pipe-end, and an intermediate member 35 to which the lug is adjustably connected as well understood in the art, and which is also adjustably connected to bracket 32 to adapt the connection for pipes of different sizes.

Mechanism is provided to operate the rack 25ª and pipe A to gradually advance them as the pipe is welded and to reciprocate them to bring the portion of the pipe which immediately follows the last welded zone, back to the heaters so it will be reheated immediately before it is reciprocated back to the welding point. This mechanism for advancing the pipe comprises a pinion 37 which is fixed to a cross-shaft 39 which is journalled in a carrier 38 which is horizontally slidable in stationary base 31. Pinion 37 meshes with rack 25ª and its rotation causes the rack and pipe to be advanced relatively to the carrier and brings successive portions of the pipe to the welding point while the reciprocation of the carrier 38 imparts bodily back-and-forth movement to the rack and pipe.

The mechanism for rotating pinion 37 to advance the pipe during its reciprocation comprises an electric motor 40 mounted on an extension of base 31, a pinion 41 on the motor-shaft, a gear 42 meshing with said pinion, a shaft 43 to which gear 42 is fixed and which has a polygonal portion 44, a worm 45 slidable on and driven by said shaft-portion 44, and a worm gear 46 fixed to shaft 39 and which is driven by worm 45. A gear-case 47 enclosing gear 46 and worm 45, is secured to carrier 38, and causes said worm to slide with the carrier and on shaft-portion 44 to constantly maintain its driving connection therewith, and to reciprocate the worm with gear 46, shaft 39 and carrier 38.

The mechanism for reciprocating gear carrier 38 to reciprocate the pipe comprises an electric motor 48 mounted on a base 53, a pinion 49 on the motor shaft; a gear 50 meshing with said pinion and fixed to a shaft 51 which is journalled in bearings 52 on base 53; a clutch 54 of any suitable construction for controlling the rotation of a pinion 55; a gear wheel 57 which is rotatably mounted on a stud-shaft 58 which is non-rotatably fixed in a supporting-bracket 59; a planetary pinion 60 fixed to a stud-shaft 61 which is rotatably mounted in gear 57, so said pinion can move bodily with gear 57 and can rotate around its own axis; a stationary pinion 62, which is fixed to stationary shaft 58 and meshes with planetary pinion 60 to cause the latter to rotate on its own axis; a crank or wrist-pin 63 fixed to a disk 64 which is integral with the planetary pinion 60 so it will move in a path, the shape of which is indicated by line 65 (Fig. 1ª), which results from compounding the bodily movement of said pinion around the axis of shaft 58 and its rotation around its own axis; and a link or pitman 66 which is pivoted to wrist-pin 63 and to a stud 67 on carrier 38.

The path of the zone on the pipe being welded, will be, in consequence of this compound movement, as diagrammatically indicated in Fig. 2, and will include differential reciprocation, i. e., a short back-and-forth cycle $a$, and a long back-and-forth cycle $b$ lapping at one end the short cycle, and as a result, the pipe will make four short passes between the welding rolls during each rotation of gear 57 and but one long stroke to bring the portion adjacent the welding zone to the heaters. This feature is important because it produces an increased number of welding passes relatively to the number of long strokes to the heater.

Mechanism is provided to raise and lower the upper welding-roll 23 so that the pipe will be free from welding pressure during that portion of its long stroke when the portion adjacent the welding zone is moving to and from the heaters. For this purpose roll 23 is vertically movable with a carrier 70 which is vertically slidable in a guide-box 71 which is fixed to the outer end of frame-member 27. A cross-pin 72 is held in carrier 70 and a slide-block 73 has a cam-slot 74 through which said pin extends. The slide block 73 is horizontally slidable in box 71 to raise and lower the carrier 70 and the upper welding roll 23. The latter is mounted on a pin 72ª in a block 70ª which is adjustably connected to the carrier by a wedge 75 which has flanges fitting in grooves on said carrier and block, respectively, and can be adjusted by a screw 76 threaded to a bar 77 fixed to the sides of the carrier, so that the roll may be conveniently adjusted for welding metal of different thicknesses. The mechanism for operating block 73 to raise and lower the roll 23 comprises a gear 78 meshing with gear 57 which is driven from motor 48 through clutch 54, and fixed to a shaft 79 journalled in a bracket 80 secured to frame member 13, a wrist-pin 81 on a disk 82 fixed to shaft 79, and a connecting-rod on link 83 pivoted to said wrist-pin and at 85 provided with a socket which is pivoted to slide-block 73. In practice it is sometimes desirable to operate the machine to polish or smoothen the joint by reciprocating the pipe while it is under constant pressure between the rolls 12 and 23, and for this purpose means are provided to disconnect the slide 73 from its reciprocating mechanism. This device consists of socket 85, a head 86 on rod 83 and slidable in said socket, and a releasable locking-dog 87 which is operable by a lever 88 which is pivoted to and movable bodily with the socket. When the dog is lowered it will lock the head 86 to rod 83 and in one end of the socket. When the dog is raised the head will be free to slide in the socket, the latter and slide 73 remaining stationary so the roll 23 will remain lowered. The dog and head are provided with beveled ends so the head will be automatically locked to the socket at the end of the instroke of rod 83, when the dog is lowered. The construction exemplifies conveniently and quickly operable mechanism for controlling one of the welding rolls to cause it to remain constantly operative while the pipe is being reciprocated, for polishing the welded joint.

The operation will be as follows: Assuming motor 48 to be operating, and the pipe A to be fixed to rack 25ª, the pipe and rack will be reciprocated in the path diagrammed in Fig. 2, through the planetary pinion 60, wrist-pin 62, link 61, carrier 38, and pinion 37 which meshes with the rack. This will result in four short passes of the pipe between the welding rolls during each complete cycle of movement or rotation of the planetary pinion 62 and one long back-and-forth stroke to carry the portion of the pipe adjacent the welding zone or point to and back from the heaters. This result is automatically attained by the mechanism set forth so that no special manipulation by the operator is necessary. During the reciprocations of the pipe as aforesaid, the motor 40, through gears 41, 42, shaft 44, slidable worm 45, gear 46 and shaft 39, will rotate pinion 37 to advance the rack and bring successive portions of the pipe between the welding rolls. The mechanism for shifting the upper roll 23 will also be operated to alternately keep the roll lowered and in its operative position during the welding portions of each reciprocation of the pipe and to release it for its passage to the heaters.

The invention is not to be understood as restricted to the particular construction set forth but may be modified within the scope of the appended claims, without departing from the spirit and scope of the invention.

I claim:—

1. In a welding machine, the combination of means to heat the work, means for welding the heated work operative by movement of the work, and mechanism for automatically imparting reciprocatory strokes of different lengths to said work.

2. In a welding machine, the combination of means to heat the work, means for welding the heated work operative by movement of the work, mechanism for automatically imparting reciprocatory strokes of different lengths to said work, and means for automatically controlling the welding-means to release the work during a portion of the strokes.

3. In a welding machine, the combination of means to heat the work, means for welding the heated work, mechanism for automatically imparting to the zone of the work being welded relatively short welding strokes and relatively long strokes to and from the heating-means, and means to progressively feed the work to the welding-means.

4. In a welding machine, the combination of means to heat the work, means for welding the heated work, mechanism for automatically imparting to the zone of the work being welded relatively short welding strokes and relatively long strokes to and from the heating-means, and mechanism for automatically releasing the welding-means during the strokes to the heating-means.

5. In a welding machine, the combination of means to heat a pipe, inner and outer elements for welding the heated pipe operative by movement of the pipe, mechanism for shifting the pipe between the welding-elements and the heating-means, comprising means to automatically impart reciprocatory movement to the pipe, and means for automatically controlling one of the welding-elements, to release the pipe during the movement to and from the heating-means.

6. In a welding machine, the combination of means to heat the work, welding-means for the heated work, and mechanism for shifting the work between the welding means and the heating-means, comprising means to automatically shift the work so that the zone being welded travels back and forth between the welding means a greater number of times than it travels to and from the heating means.

7. In a welding machine, the combination of means to heat a pipe, inner and outer welding-elements for the heated work, and mechanism for shifting the work between the welding-elements, and the heating-means, comprising means to automatically shift the work so that the zone being welded travels back and forth between the welding means a greater number of times than it travels to and from the heating means.

8. In a welding machine, the combination of means to heat the work, means for welding the heated work operative by movement of the work, and mechanism for shifting the work between the welding means and the heating means, comprising means to automatically impart differential reciprocatory strokes to the work, so there will be a plurality of welding-reciprocations of the zone being welded for each reciprocation of said zone to the heating-means.

9. In a welding machine, the combination of means to heat a pipe means for welding the heated work operative by movement of the work, comprising inner and outer welding elements, and mechanism for shifting the pipe between the welding-elements and the heating-means, comprising means to automatically impart differential reciprocatory strokes to the work, so there will be a plurality of welding reciprocations of the zone being welded for each reciprocation of said zone to the heater.

10. In a welding-machine, the combination of means to heat the work, means for welding the heated work operative by movement of the work, mechanism for shifting the work between the welding-means and the heating-means, comprising means to automatically impart differential reciprocatory strokes to the work, so there will be a plurality of welding reciprocations of each zone being welded for each reciprocation of said zone to the heater, and means to automatically release the welding-means during each stroke to and from the heater.

11. In a welding machine, the combination of means to heat the work, elements for welding the heated work by relative reciprocation of the elements and work, and mechanism for automatically imparting relative movement between the work and the welding-elements and heating-means, comprising means to alternately produce long and short reciprocations.

12. In a welding machine, the combination of means to heat the work, welding-means for the heated work operative by reciprocation of the work, and shifting mechanism for the work, comprising means to automatically produce long and short reciprocations.

13. In a welding machine, the combination of means to heat the work, welding-means for the heated work, and mechanism for shifting the work between the welding-elements and the heating-means, comprising a planetary gear and a link operated thereby.

14. In a welding machine, the combination of means to heat the work, welding-means for the heated work, and mechanism for shifting the work between the welding-elements and the heating-means, comprising a planetary gear, a wrist-pin on the gear, and a link operated by said pin.

15. In a welding mechine, the combination of means to heat the work, welding-means for the heated work, and mechanism for shifting the work between the welding-elements and the heating-means, comprising a gear rotating on a fixed axis, a planetary gear carried by said gear, a stationary gear to rotate the planetary gear on its own axis, and a link operated by said planetary gear.

16. In a welding machine, the combination of means to heat the work, welding-means for the heated work, and mechanism for reciprocating the work comprising a planetary gear, a link operated by said gear and a reciprocable carriage to which the work is attached.

17. In a welding machine, the combination of means to heat the work to be welded, welding-means for the heated work, mechanism for reciprocating the work comprising a planetary gear, a link operated by said gear and a reciprocable carriage to which the work is attached, and means to progressively feed the work to the welding-means.

18. In a welding machine, the combination of means to heat the work, welding-means for the heated work, mechanism for reciprocating the work comprising a planetary gear, a link operated by said gear and a reciprocable carriage to which the work is attached, and means to automatically release the welding-means during a portion of the movement of the carriage.

19. In a welding machine, the combination of means to heat the work, welding-elements for the heated work, mechanism for reciprocating the work, and gearing to alternately shift one of the welding elements into operative and inoperative positions.

20. In a welding machine, the combination of means to heat the work, welding-elements for the heated work, mechanism for reciprocating the work, and mechanism comprising gearing and a link operated by the gearing to alternately shift one of the welding-elements into operative and inoperative positions.

21. In a welding machine, the combination of means to heat the work, welding-elements for the heated work, and mechanism comprising gearing, a link operated by the gearing, and means having a cam slot operated by the link to alternately shift one of the welding-elements into operative and inoperative positions.

22. In a welding machine, the combination of means to heat the work, welding-means for the heated work, mechanism for reciprocating the work, and mechanism to alternately render the welding-means operative and inoperative comprising movably connected elements and means for releasably locking them.

23. In a welding machine, the combination of means to heat the work, welding-means for the heated work, mechanism for reciprocating the work, and mechanism to alternately render the welding-means operative and inoperative comprising slidably connected elements and means for releasably locking them.

24. In a welding machine, the combination of means to heat the work, welding-means for the heated work, mechanism for reciprocating the work, and mechanism to alternately render the welding means operative and inoperative comprising a link composed of slidably connected elements and means for releasably locking them together.

Signed at Chicago, Illinois, this 14th day of September, 1923.

JAMES HALL TAYLOR.